United States Patent
D'Angelo et al.

(10) Patent No.: US 10,126,454 B2
(45) Date of Patent: Nov. 13, 2018

(54) METHOD AND SYSTEM FOR FRACTURE DETECTION USING ACOUSTIC WAVES

(71) Applicant: SCHLUMBERGER TECHNOLOGY CORPORATION, Sugar Land, TX (US)

(72) Inventors: Ralph M. D'Angelo, North Weymouth, MA (US); Kenneth W. Winkler, Ridgefield, CT (US); Christoph Klieber, Paris (FR); Mikhail Lemarenko, Le Plessis-Robinson (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 290 days.

(21) Appl. No.: 14/983,701

(22) Filed: Dec. 30, 2015

(65) Prior Publication Data

US 2017/0192117 A1    Jul. 6, 2017

(51) Int. Cl.
*G01V 1/50* (2006.01)
*G01V 1/30* (2006.01)

(52) U.S. Cl.
CPC ............... *G01V 1/50* (2013.01); *G01V 1/303* (2013.01); *G01V 2210/1299* (2013.01); *G01V 2210/1429* (2013.01); *G01V 2210/74* (2013.01)

(58) Field of Classification Search
CPC .. G01V 1/50; G01V 1/303; G01V 2210/1429; G01V 2210/1299; G01V 2210/74
USPC ............................................................. 367/25
See application file for complete search history.

(56) References Cited

U.S. PATENT DOCUMENTS

| | | | | |
|---|---|---|---|---|
| 4,293,934 A | * | 10/1981 | Herolz | G01V 1/46 346/33 WL |
| 4,799,200 A | * | 1/1989 | Cheung | G01V 1/50 367/30 |
| 8,950,482 B2 | * | 2/2015 | Hill | E21B 43/11857 166/177.5 |
| 9,079,221 B2 | * | 7/2015 | Goodman | B06B 1/0625 |
| 2005/0002276 A1 | * | 1/2005 | Yogeswaren | G01V 1/186 367/152 |
| 2013/0169279 A1 | * | 7/2013 | Morys | G01V 11/007 324/338 |

* cited by examiner

*Primary Examiner* — Daniel L Murphy

(57) ABSTRACT

Methods and systems for identifying and locating fractures within a wellbore are described herein. One such method includes generating an acoustic wave. At least a first portion of the acoustic wave travels along a wall of the wellbore. The first portion of the acoustic wave interacts with a feature on the wall of the wellbore, such as a fracture, and generates a second acoustic wave. The second acoustic wave is detected to obtain acoustic data. A chevron pattern is identified within the acoustic data and a location for the feature is determined using the identified chevron pattern.

26 Claims, 13 Drawing Sheets

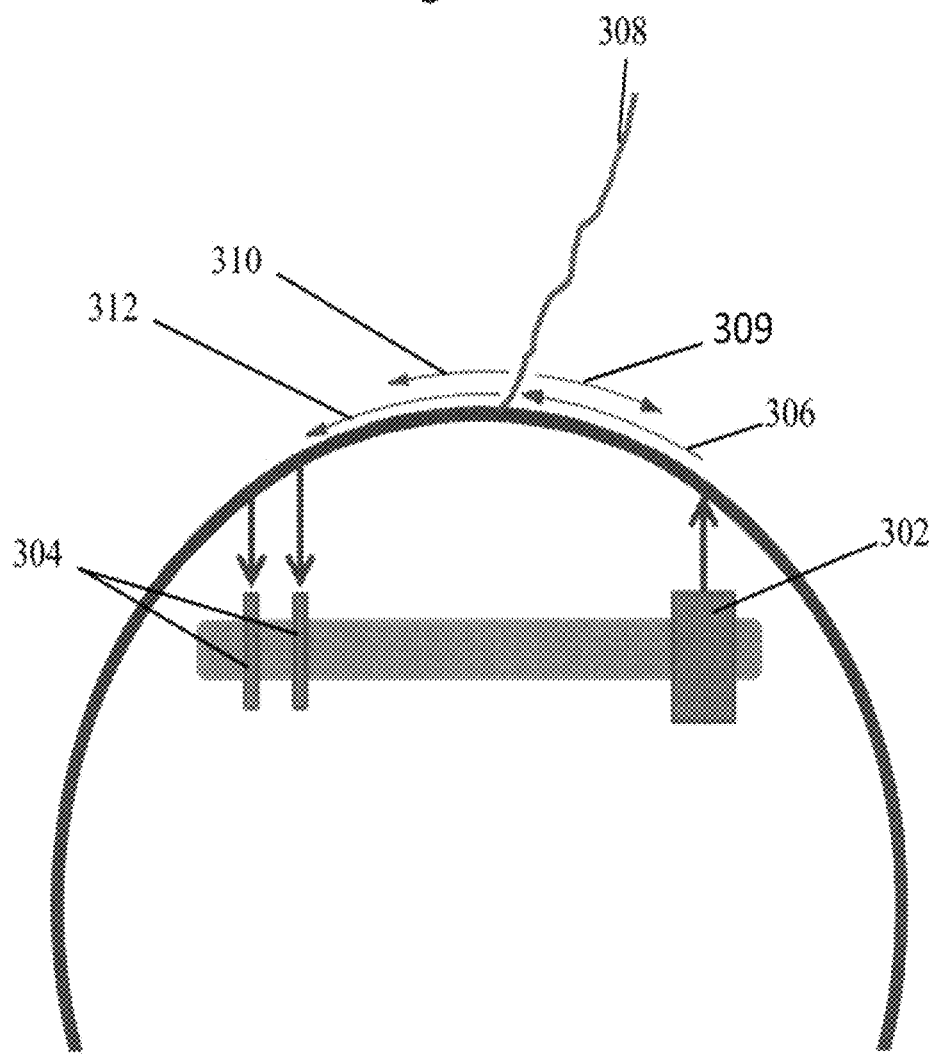

upper borehole lower borehole

METHOD AND SYSTEM FOR FRACTURE DETECTION USING ACOUSTIC WAVES

BACKGROUND OF THE DISCLOSURE

In recent years there has been demand for fracture imaging and fracture counting methods, largely driven by shale fracturing ("fracking"), shale drilling, and completions design for lateral shale wells. Because of this demand, attention has turned to acoustic measurements, and especially ultrasonic refractive techniques. Locating and imaging fractures is important in the process of locating hydrocarbons and, if found, optimizing the completions processes. Those fractures can be difficult to detect for a variety of reasons, including mud type and the condition of the fracture. For instance, a fracture may be an open fracture or it may be one that has healed (closed by mineral deposition) and therefore has low acoustic contrast relative to adjacent formations, making it rather invisible to standard acoustic reflectivity imaging. Electrical resistivity tools have been used to locate fractures, but they are useful only in certain wellbore environments and therefore have limited applicability.

SUMMARY

Illustrative embodiments of the present disclosure are directed to a method for identifying and locating fractures within a wellbore that traverses a formation. The method includes generating a first acoustic wave. At least a first portion of the wave travels along a wall of a wellbore (e.g., a compressional headwave). The first portion of the first acoustic wave interacts with a feature on the wall of the wellbore, such as a fracture. This interaction generates a second acoustic wave (e.g., a Scholte wave). The second acoustic wave is detected to obtain acoustic data. A chevron pattern is identified within the acoustic data and a location for the feature is identified using the identified chevron pattern.

In some embodiments, identifying the chevron pattern within the acoustic data includes generating an image using the acoustic data and identifying the chevron pattern within the image.

In some embodiments, determining the location of the feature using the chevron pattern includes determining a slope of the chevron pattern within the image and determining a velocity of the formation or a slowness of the formation using the determined slope.

In some embodiments, determining the location of the feature using the chevron pattern includes determining an intersection point of the chevron pattern with a first arrival corresponding to a third portion of the second acoustic wave (e.g., a compressional headwave) and determining the location of the feature using the intersection point.

In further illustrative embodiments of the present disclosure, a method uses acoustic waves that reflect from the wall of the wellbore to identify and locate fractures within the wellbore. The method includes generating an acoustic wave. A first portion of the acoustic wave travels along a wall of a wellbore and reflects from a feature on the wall of the wellbore and a second portion of the acoustic wave reflects from the wall of the wellbore. The first portion of the acoustic wave and the second portion of the acoustic wave are detected to obtain acoustic data. A location of the feature is determined using the acoustic data associated with the first portion of the acoustic wave and the second portion of the acoustic wave.

In some embodiments, determining a location of the feature using the acoustic data associated with the first portion of the acoustic wave and the second portion of the acoustic wave includes using an arrival time for the second portion of the acoustic wave to normalize an arrival time for the first portion of the acoustic wave.

In some embodiments, determining a location of the feature using the acoustic data associated with the first portion of the acoustic wave and the second portion of the acoustic wave further includes: (i) generating normalized acoustic data from the normalized arrival time for the first portion of the acoustic wave; (ii) identifying a chevron pattern within the normalized acoustic data; and (iii) determining the location of the feature using the identified chevron pattern.

Illustrative embodiments of the present disclosure are also directed to a system for locating features in a wellbore, such as fractures. The system includes a wellbore tool that transmits acoustic waves and detects acoustic waves to obtain acoustic data. The system further includes a processor that identifies a chevron pattern within the acoustic data and determines a location for a feature within the wellbore using the identified chevron pattern.

In some embodiments, the wellbore tool includes a transducer configured to transmit acoustic waves and receive acoustic waves. The transducer may be a phased array transducer.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. Embodiments are described with reference to the following figures. The same numbers are generally used throughout the figures to reference like features and components.

FIG. 3 is a plan view of a microsonic sensor system that includes a transmitter and, in this embodiment, two receivers, and may be used to analyze excited and mode-converted waves that can exist for a microsonic sensor in accordance with various embodiments of the present disclosure.

DETAILED DESCRIPTION

Figure 1:
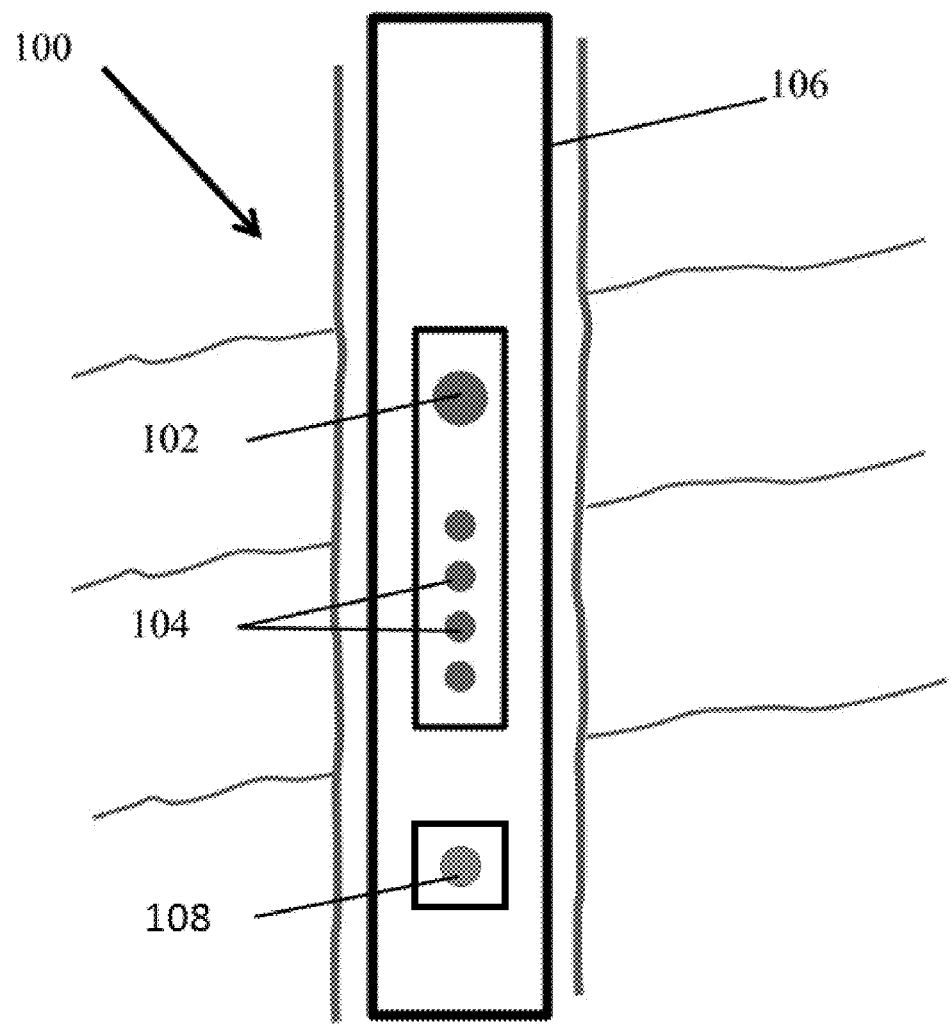
FIG. 1 is an elevation view schematic diagram of an acoustic tool having a transmitter and a plurality of receivers disposed in a wellbore in accordance with various embodiments of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Some embodiments will now be described with reference to the figures. Like elements in the various figures may be referenced with like numbers for consistency. In the following description, numerous details are set forth to provide an understanding of various embodiments and/or features. However, it will be understood by those skilled in the art that some embodiments may be practiced without many of these details and that numerous variations or modifications from the described embodiments are possible. As used here, the terms "above" and "below", "up" and "down", "upper" and "lower", "upwardly" and "downwardly", and other like terms indicating relative positions above or below a given point or element are used in this description to more clearly describe certain embodiments. However, when applied to equipment and methods for use in wells that are deviated or horizontal, such terms may refer to a left to right, right to left, or diagonal relationship, as appropriate. It will also be understood that, although the terms first, second, etc. may be used herein to describe various elements, these elements should not be limited by these terms. These terms are only used to distinguish one element from another.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

A system and method to detect many different fracture types, many different operating conditions, is disclosed. The effects of a fracture can be detected by an acoustic array as it moves in a wellbore. The acoustic array comprises a transmitter and one or more receivers distributed either circumferentially, axially, or both along a tool body and displaced from the transmitter by a fixed distance. The transmitter is configured to transmit at a fixed or variable rate, while the receivers are monitored (i.e., digitally captured in synchronization with the transmission). A waveform data set, acquired over the surface of the wellbore, may be used to produce a high quality wellbore fracture map. Such a map may be produced using a single receiver waveform set. A signal processing approach for fracture-mapping that relies on any of various microsonic measurement systems is disclosed herein. Measurements can be made using any frequency from sonic to ultrasonic, but are generally in the frequency range between 50 kHz and 2 MHz. Systems that use at least one transmitter to create a refracted wave in the formation and at least one receiver to capture that refracted formation wave as it propagates away from the transmitter are referred to herein as "microsonic" systems. Systems that use at least one transmitter to create a refracted wave in the formation and at least one receiver to capture the refracted formation wave as it propagates back toward the transmitter after reflection from a feature causing an acoustic impedance contrast are referred to herein as "pulse-echo" systems. In a pulse-echo system, the one receiver may be the same device as the one transmitter (i.e., a transceiver).

In at least one embodiment, and as shown in FIG. 1, an acoustic array detection system 100 comprises a transmitter 102 and two or more receivers 104 mounted on a tool 106. In one embodiment, the tool 106 is a logging-while-drilling (LWD) tool and the transmitter 102 and the two or more receivers 104 are mounted on drilling collar. In another embodiment, the tool 106 is a wireline tool. The detection system 100 is run downhole such as during drilling operations or during a post-drilling measurement operation. The transmitter 102 will "fire", creating a refracted signal in the formation that is ultimately detected by the receivers 104. Multiple receivers can be used. For example, in one embodiment, four or more receivers are used. In the embodiment shown in FIG. 1, the receivers 104 are axially spaced. In another embodiment, the receivers 104 are radially spaced, as shown in FIG. 3. In some embodiments, the tool 106 can include receivers 104 that are both axially and radially spaced. In additional or alternative embodiments, the tool 106 can include a transceiver 108 that functions as both the transmitter 102 and the receiver 104, such as a transducer or phased array transducer. The transceiver can perform pulse-echo imaging or microsonic imaging for discerning, for example, formation velocity, fracture maps, and fracture counts. Axial and circumferential microsonic measurements may be made that provide coverage for complete fracture maps of a wellbore wall. Various embodiments disclosed herein can significantly enhance the fracture mapping and counting made using a downhole tool and any other microsonic related measurement system.

The transmitter of the acoustic array, being disposed in a wellbore, typically transmits its acoustic signal into the wellbore fluid. As such, the resulting wave is essentially a compressional wave since the fluid, for practical purposes, does not support transverse waves. When the compressional wave encounters an acoustic impedance contrast, such as that presented by the wellbore wall, a portion of the wave energy is reflected, a portion is transmitted into the formation, and a portion travels along the fluid/wellbore wall interface. That portion that travels along the interface comprises a compressional headwave, a shear headwave, and an interface wave known as a Scholte wave. The Scholte wave often arrives at a receiver at around the same time as the shear headwave, but is typically more energetic than the shear headwave. Thus, it is common for the shear headwave to be barely discernable or distinguishable from the Scholte wave. The industry commonly refers to the Scholte wave as a pseudo-Rayleigh wave and often treats it to be the same as the shear headwave. For accuracy and ease of discussion, the term "Scholte wave" will be used herein to include pseudo-Rayleigh waves and shear headwaves as well. As the headwaves propagate along the interface, they "leak" energy back into the wellbore where they are detected by the receivers as fluid compressional waves. The Scholte wave also generates compressional waves in the fluid that can be detected by the receivers. The time delay between the received signals and the amplitudes of the signals are useful in determining important formation properties. For example, the various waves and their associated travel times can be used to infer formation characteristics or rock properties that can be useful for developing efficient well completion strategies. Such rock properties may include, but are not limited to, Young's modulus, Poisson's ratio, and bulk modulus.

Fractures often exist in reservoir formations. It is of interest to know where they intersect the wellbore, and, if possible, to determine characteristics of the fractures, including aperture (width) and strike (orientation). For example, the location of the fractures can be used when designing fracturing and/or completions operations. Using acoustic techniques, fractures can be detected because they perturb or affect (at least) the compressional headwaves that encounter them. That is, a fracture may cause an incoming compressional headwave to spawn other wave types. For example, a compressional headwave that encounters an acoustic impedance contrast (e.g., a fracture) generally gives rise to (among others): (i) a mode-converted Scholte wave that travels along the interface in the same direction as the incoming compressional headwave; and (ii) a mode-converted Scholte wave that travels along the interface in the opposite direction as the incoming compressional headwave. In addition, some of the energy of the incoming compressional headwave simply traverses the fracture and continues as a compressional headwave traveling along the interface in the same direction as the incoming compressional headwave.

As stated above, the energy propagating along the interface as a headwave is constantly refracting back (i.e., "leaking") into the wellbore at some critical angle that depends on the acoustic velocity of the fluid and the acoustic velocity of the formation (at the particular point where the energy leaves the formation and enters the fluid), in accordance with Snell's Law. Thus, at least some of the incident energy that is refracted into the wellbore formation ultimately returns to the wellbore as compressional energy, where it is detected by the receivers. As the signal travels in the formation, it may be attenuated or scattered depending on the local rock properties, and therefore the signals received at various receivers may have different amplitudes or pulse shapes.

One technique to detect fractures is based on detecting waveforms "originating" from the aperture (fracture) that appear on a waveform image as a chevron (a linear moveout) pattern. The chevron appears on an image of waveforms collected over some distance when a physical feature, such as a fracture, causes variations on a spatial plot of the received waveforms. These variations usually present as a straight line at a given slope to the spatial axis. The compressional headwave is generally the fastest traveling wave and, while its travel along the interface may be perturbed somewhat by changes in lithology, it is generally more significantly perturbed by formation fractures. A waveform plot of a received signal generally shows first the arrival of the compressional headwave, followed by the slower, trailing Scholte wave. In an image of the waveforms received, plotted over travel distance, these Scholte waves are seen as chevron-shaped components that are at some angle relative to the image of the initiating compressional signal. The location in space (depth and azimuth) where the chevron intersects the first-arrived compressional signal indicates the wave's location of origin on the wellbore wall. Using an image processing technique on this waveform image, an excellent fracture-map for the formation can be produced.

These chevron-shaped images are generally quite strong relative to the originating compressional headwave signal, as they are Scholte waves that are excited at the discontinuity of the fracture interface. However, if the fracture is healed or welded closed, the chevron patterns are reduced significantly. This phenomenon allows for an interpretation of healed vs. open fractures.

Figure 2:
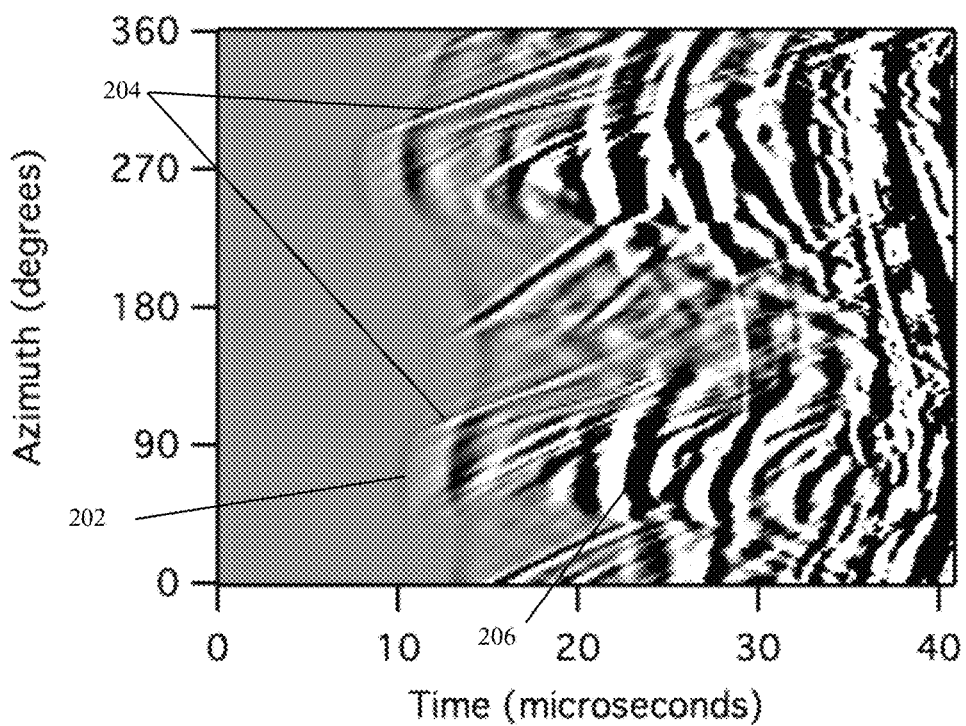
FIG. 2 is a VDL (variable density log) image of received waveforms from a circumferential scan of a wellbore in accordance with various embodiments of the present disclosure.

FIG. 2 is a VDL (variable density log) image of received waveforms from a circumferential scan of a wellbore having both anisotropy and several fractures that are oriented axially relative to the wellbore (perpendicular to wave propagation). The waveform VDL image shown is taken from a single receiver of a circumferential microsonic system in a wellbore of a slate formation. A circumferential microsonic sensor system is shown in FIG. 3, and includes a transmitter 302 and two receivers 304, though more or fewer (e.g., one) receivers may be used. The chevron patterns seen in the image of FIG. 2, originating at the first-arrival of the compressional signal, have been shown to be mode conversions of compressional waves (i.e., Scholte waves) that continue along the wellbore wall. As these image features have origins along the compressional arrival that correspond to their locations on the wellbore wall, they are useful for imaging the fractures. These features may be evident at some or all of the receivers.

In the waveform image of FIG. 2, a double sinusoidal variation 202 in the arrival time of the compressional signal appears over the 360 degrees of the wellbore, varying from around ten microseconds to approximately twelve microseconds. The later arrivals occur at approximately zero and 180 degrees, and the earlier arrivals occur at about 90 and 270 degrees. These variations are due to the significant velocity anisotropy that exists around this slate wellbore. In the image, strong chevron patterns 204 that originate at various locations in azimuth appear at the intersection with the compressional arrival. These chevrons are related to fractures in this slate sample, of which there are several that run axially along the wellbore (perpendicular to a circumferential propagation).

FIG. 3 is a schematic model of an acoustic tool used to analyze the compressional to Scholte mode-converted waves. A transmitter 302 excites a set of waves 306 that travel along the wellbore/fluid interface toward the receivers 304. The compressional headwave component of this wave set 306 encounters a fracture 308 and is partially converted to a Scholte wave 310 that continues to propagate around the circumference of the wellbore and also a Scholte wave 309 that propagates back towards the transmitter 302. Not all of the incident wave energy is converted to a Scholte wave. Some portion continues to travel along the interface as a compressional headwave 312. As stated above, that compressional headwave 312 generally travels faster than the other waves in the set and thus generally appears first on the record. The Scholte wave 310 arrives some time later in the record. It is noted that the original Scholte wave 306 created when the transmitted wave first entered the formation, as part of wave set 306, also appears on the record (approximately 24 μs on FIG. 2). It is delayed relative to the other earlier arrivals because it has traversed the entire portion of the wellbore wall at the generally slower wave speed of the Scholte wave. Its time of arrival also appears as a double sinusoid across azimuth, due to anisotropy.

In the example provided in FIG. 3, the Scholte wave 310 that propagates around the circumference of the wellbore away from the transmitter 302 is detected and used to identify the fracture 308. In additional or alternative embodiments, the Scholte wave 309 that propagates towards the transmitter 302 can be detected and used to identify the fracture 308.

As explained above, the acoustic data (e.g., waveforms) received at the receivers can be used to generate a spatial image, such as a VDL image, as shown in FIG. 2. Image processing can be used to identify chevron patterns within the spatial image. The following set of rules can be used to identify chevron patterns within the spatial image: (i) the chevron pattern will be linear and continuous along at least a portion of the spatial image; (ii) the chevron pattern will originate at the first arriving compressional wave in the spatial image; and/or (iii) the velocity derived from the slope of the chevron pattern will match a velocity for the formation at the location of the origin of the chevron pattern. Some or all of these rules can be used to identify the chevron pattern within the spatial image.

With respect to rule (iii) described above, the velocity derived from the chevron pattern can be determined by analyzing the slopes of the chevron pattern in the spatial image, which correspond to a velocity. The slope of the chevron relative to the acoustic velocity of the formation at the point of origin of the chevron may be used to calculate a mode-converted Scholte wave velocity of the formation at the location within the formation corresponding to the point of origin. This calculated Scholte wave velocity should match the Scholte wave velocity for the formation at the specific location in depth and azimuth from where the chevron originates. The Scholte wave velocity is obtainable by known means. For example, the Scholte wave and other formation velocities can be determined from microsonic measurements. For example, U.S. Pat. No. 6,678,616, by Winkler et al., issued on Jan. 13, 2004, which is hereby incorporated by reference in its entirety, describes a method for demining formation velocities for pseudo-Rayleigh waves (referred to as Scholte waves herein).

To determine the mode-converted wave velocity for the case of an incident compressional headwave converted to a Scholte wave at the fracture (as depicted in FIG. 3), the equation shown below can be used. Here the compressional headwave strikes a fracture, and part of the energy converts to a Scholte wave. Analysis begins by finding the slope of the chevron. At any given scan position, the Scholte wave will arrive some time Δt after the direct compressional wave arrival. Let Δx represent the path traveled by the Scholte wave 310. After the compressional wave component of wave set 306 hits the fracture 308, it continues as a compressional wave 312, but also produces a converted Scholte wave 310. The transmitted compressional wave 312 and the generated Scholte wave 310 traverse the same path, Δx. If the compressional wave 312 hits the fracture at time zero, relative to that time, the compressional wave 312 will arrive at the receiver at some later time, $\Delta x/V_p$. The converted Scholte wave 310 will arrive at time $\Delta x/V_s$. The difference in arrival times, Δt, is given by:

$$\Delta t = \Delta x/V_s - \Delta x/V_p$$

Replacing Δx by the arc length, RΔθ, where R is the wellbore radius and Δθ is the angle from the fracture to the wave exit point on the wellbore wall, gives (after rearrangement) the following equation for slowness:

$$\frac{1}{V_s} = \frac{1}{V_p} + \frac{\Delta t}{R\Delta\theta}$$

where $V_s$ and $V_p$, respectively, are the Scholte wave and compressional headwave speeds. As can be seen in FIG. 2, Δt/Δθ is the (reciprocal) slope of a chevron. This provides the Scholte wave velocity of the formation at the specific location on the wellbore wall where the Scholte chevron originates. As stated above, the velocity may alternatively be determined using differential travel times for two or more receivers. $V_p$ can be determined for a standard multi-receiver microsonic system from slowness time coherence (STC) or first-motion analysis of arrivals at near and far receivers.

Using rule (iii) stated above (determining the mode-converted wave velocity) helps to rule out including locations in the fracture-chevron image that are not relevant to fractures. However, in reality, this may not be necessary, as any chevrons that get included in the "fracture" set that are not related to fractures, but result from some other anomaly in the wellbore (e.g. a localized calcium deposit), would generally not be contiguous around the wellbore and could easily be ignored using rule (i) stated above.

Figure 4A:
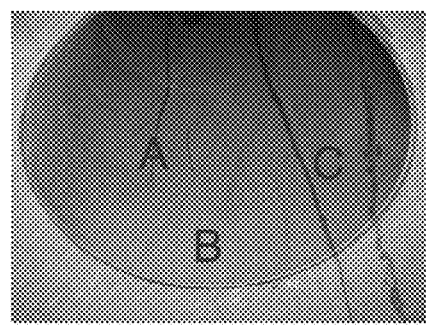
FIG. 4A is a perspective view of one end of a slate block having a wellbore and fractures in accordance with various embodiments of the present disclosure.
Figure 4B:
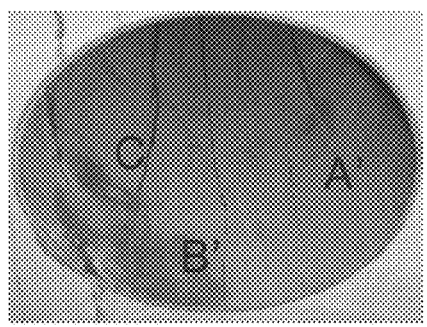
FIG. 4B is a perspective view of the opposite end of the slate block of FIG. 4A in accordance with various embodiments of the present disclosure.
Figure 4C:
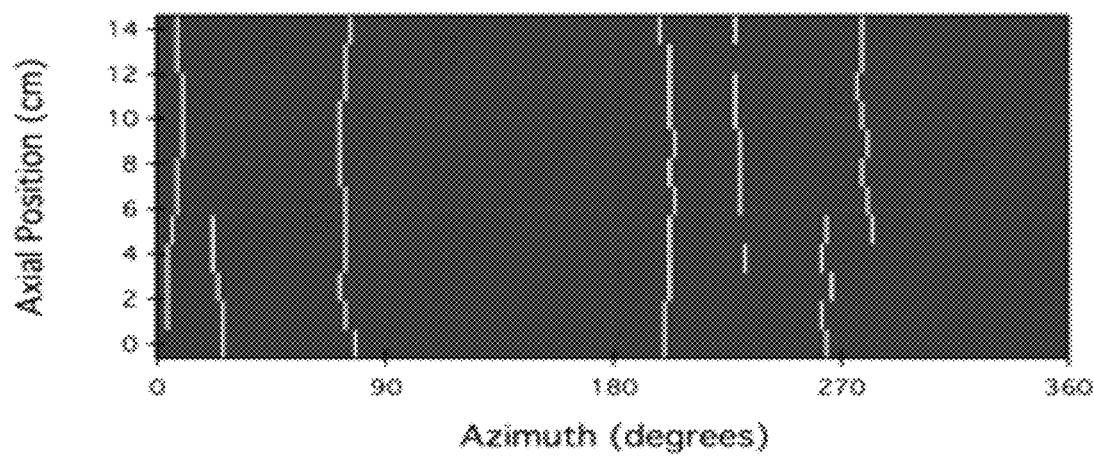
FIG. 4C is a fracture image map of the wellbore of FIGS. 4A and 4B made using hand-picked locations of the intersection of mode-conversion chevrons with the compressional signal arrival in accordance with various embodiments of the present disclosure.

After identifying these fracture-chevrons in the image, the position along the azimuthal axis where each fracture-chevron intersects the first arrival of the compressional signal is located. That location is then displayed and stored as a fracture location point on the wellbore wall image. This location can also be represented as location in time and/or depth within wellbore logging data. This can be done manually using a high-resolution computer screen or it can be automated. FIGS. 4A and 4B show opposite ends of a slate block having a wellbore. The block has various fractures running axially relative to the wellbore axis. Some of these fractures do not extend the full length of the wellbore, but instead can end or begin at points within the wellbore. FIG. 4C shows a fracture image map made using the hand-picked locations of the intersection of the mode-converted chevrons with the compressional signal arrival. The fracture map is similar to the wellbore fractures, for either end of the sample. Excellent agreement was obtained between the fracture map made using the technique described herein on a waveform data set acquired from a microsonic system in a lab and the actual locations of the fractures in a slate wellbore at both ends of the sample.

As stated above, identifying the fractures using velocity and slope information and locating the fractures in space on the wellbore wall can also be done automatically using a processor or computer. For high density data coming, for example, from a logging run, this is preferred and likely necessary. STC software is well-suited to this task. One useful approach is to "window" the waveform data to include only the chevron-related portions to enhance sensitivity. Then, STC is run with properly adjusted parameters and the STC plane is projected onto the spatial axis of the wellbore (axial or azimuthal).

Figure 5:
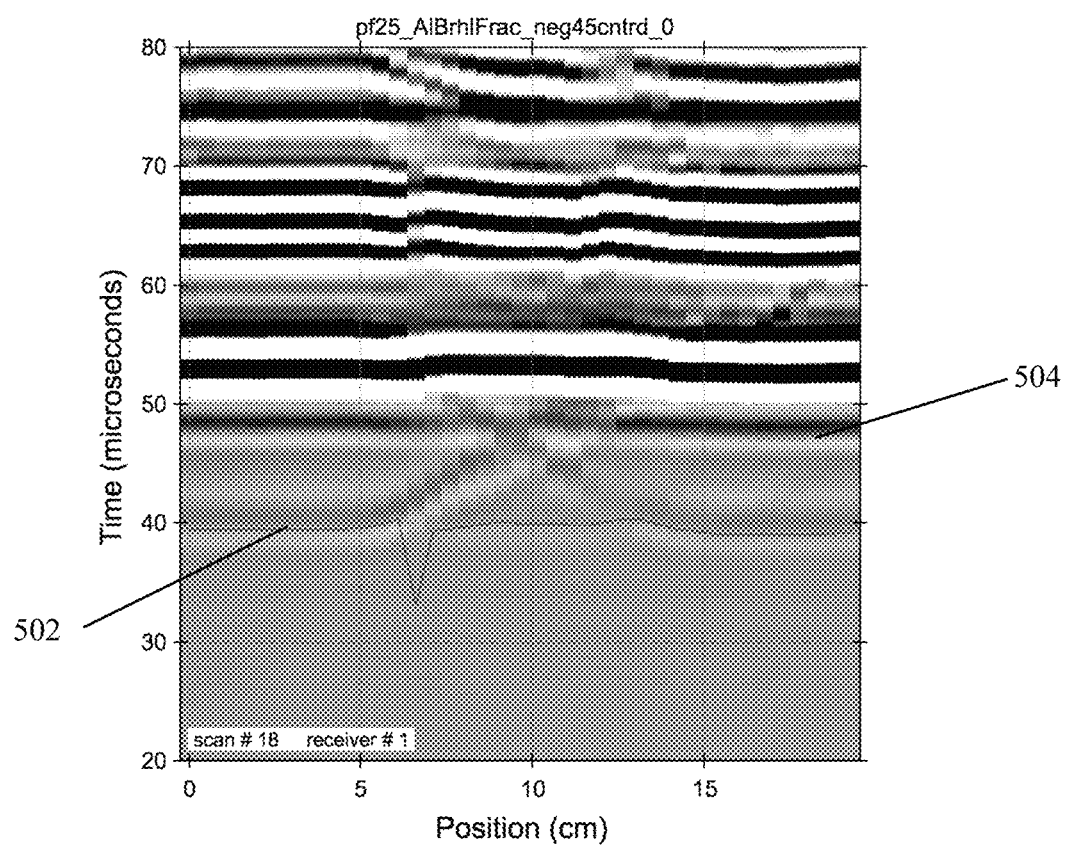
FIG. 5 is a waveform VDL from a receiver in an axial microsonic sensor over an aluminum wellbore having a 45 degree fracture (split) in accordance with various embodiments of the present disclosure.

This method was successfully tested on an aluminum wellbore that had a 45 degree split, such that the wellbore was made in two pieces. The split between the two halves formed a fracture. FIG. 5 shows a "zoomed-in" waveform VDL image for a scan of an axial microsonic sensor package over this aluminum, fractured wellbore. That is, FIG. 5 is a waveform VDL from a receiver in an axial microsonic sensor over an aluminum wellbore having a 45 degree fracture (split). The plot scales are adjusted to expand the area of interest, notably the region between the compressional headwave arrival 502 (approximately 40 μs) and the Scholte wave arrival 504 (approximately 49 μs). The scan region (i.e., positions) shown in FIG. 5 includes where the transmitter and receiver are on one side of the fracture, where the transmitter and receiver are on the opposite side of the fracture, and (between those) where the transmitter and receiver pass over the fracture or the fracture is between them. Clearly evident in the image, between approximately 40 and 50 μs, are the fracture-related mode-conversions. The region between arrival times for the compressional head-wave 502 and the converted Scholte wave 504 reveals two crossing, complimentary angled arrivals (between approximately 6 cm and 13 cm). These are converted compressional-Scholte and Scholte-compressional modes coming from the fracture. The station location where either of these chevrons intersects the compressional arrival can be used as an indicator of the fracture location relative to the receiver or transmitter, depending on which chevron is being used (one of the chevrons indicates the receiver position when it is over the fracture, and the other indicates the transmitter position when it is over the fracture).

Figure 6:
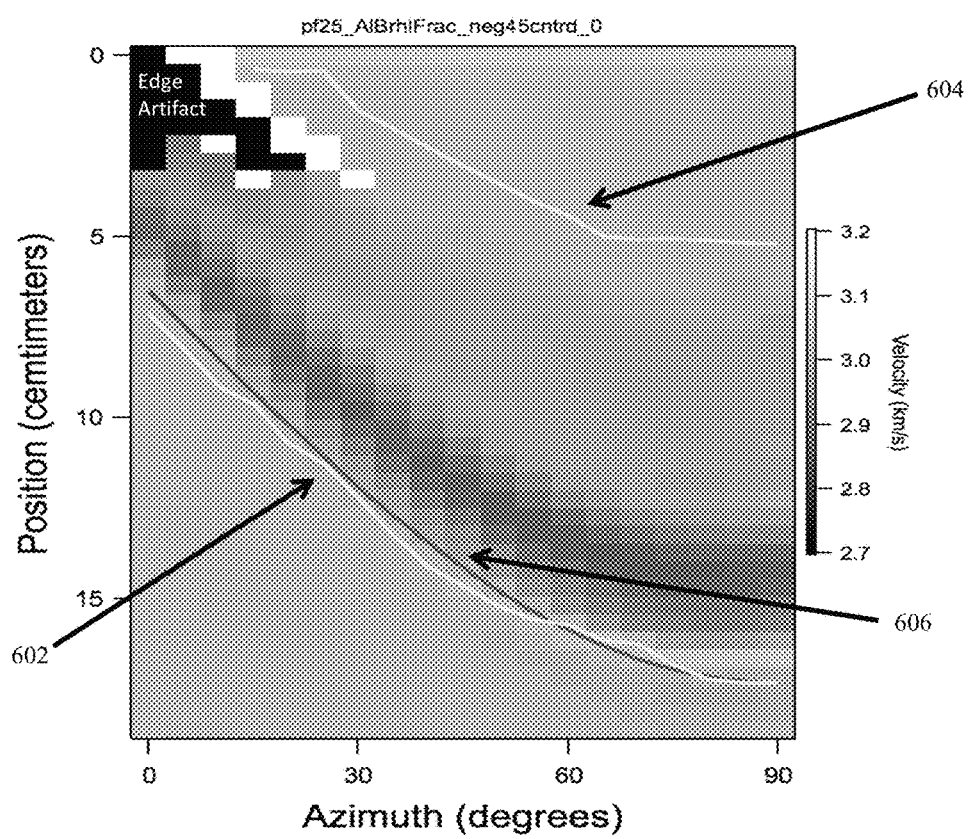
FIG. 6 is an image of the processed Scholte wave velocity taken with the axial microsonic sensor used to obtain data for FIG. 5 over the aluminum half-wellbore having a 45 degree fracture (split) in accordance with various embodiments of the present disclosure.

FIG. 6 is an image of the processed Scholte wave velocity determined using the axial microsonic sensor data of FIG. 5. The "axial scan" was performed by locating the axial scanner at a particular wellbore depth and performing a series of azimuthal measurements at that depth. The axial scanner was then moved to a new wellbore depth and the series of azimuthal measurements were repeated. That process is further repeated to obtain (azimuth, depth) data for the image. The gray scale image of FIG. 6 shows the majority of the region investigated plots as uniformly light gray, meaning the determined Scholte velocity is approximately 3.1 km/s for most of the entire image. However, for the region where the fracture mode-conversions interfere with the velocity measurement, a darker region exists that indicates a lower velocity (e.g., 2.8 to 2.9 km/s) that images the fracture. The strong events in the upper left of the image are artifacts, related only to reflections from the outer edge of the aluminum sample.

FIG. 6 also shows a computer-generated fracture image overlaid onto the Scholte velocity image for the aluminum wellbore. Lines 602, 604 are the computer-generated fracture locations for this aluminum fractured wellbore, derived from the chevrons observed on the VDL images in FIG. 5. Two such fracture lines can be created for any one fracture: one for the receiver position (e.g., 602) and one for the transmitter position (e.g., 604). Indeed, line 602 and line 604 are separated by approximately the transmitter-receiver spacing (14.4 cm). Line 606 is an arbitrarily placed 45 degree dipping line, shown for comparison. It is clear that the velocity image alone provides an image of the fracture, showing its correct orientation. However, this small aperture fracture is depicted in this image as being approximately 2-3 cm thick. This is because the resolution of the velocity image is controlled by the inter-receiver spacing.

The above-described technique provides fracture images that agree well with expected results and with corresponding velocity images at better resolution than the velocity images. The spatial resolution of this fracture detection technique may be limited by the spatial (in depth or azimuth) and time sampling of the waveform data. In the above analysis, the chevron analysis was done by STC-type stacking of the chevrons.

The techniques disclosed herein can be performed downhole (for example, while drilling or reaming) or post-processed with recorded waveform data. Fracture detection is independent of wellbore fluid (e.g., mud type). In various embodiments, healed and conductive fractures and axial fractures can be detected without regard to the wellbore wall rugosity. Various frequencies can be used for the transmitted signal, typically ranging from the sonic to the ultrasonic.

Figure 7:
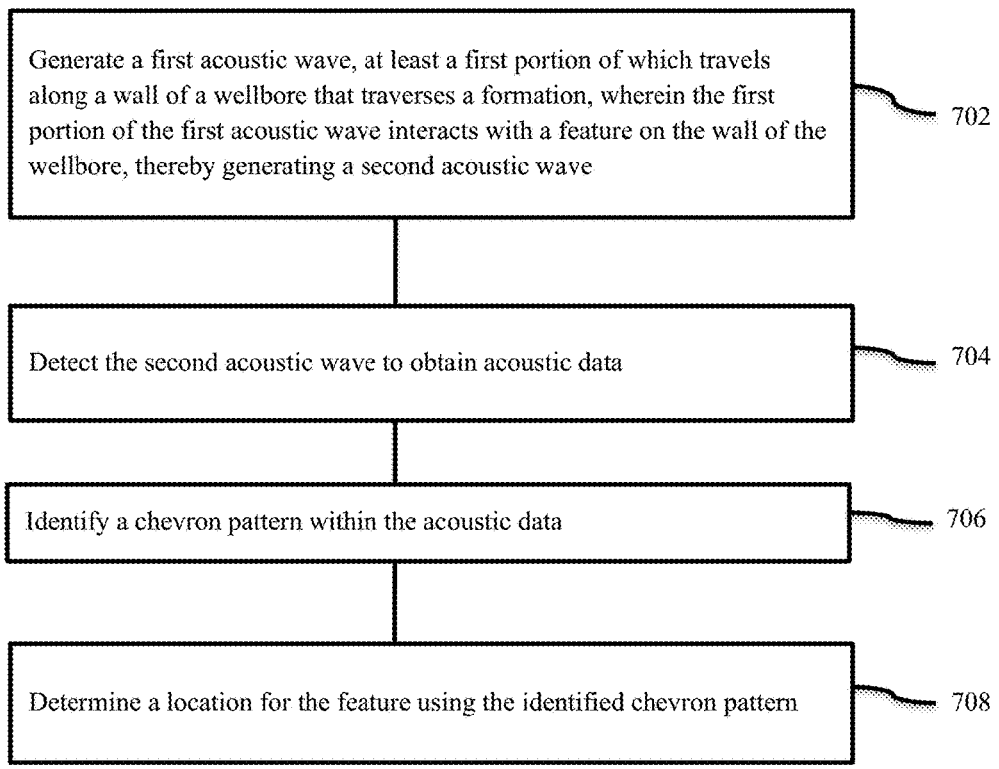
FIG. 7 is a flowchart for using an acoustic array to infer the presence or absence of fractures in a subsurface formation in accordance with various embodiments of the present disclosure.

FIG. 7 is a flowchart showing one possible embodiment. In this embodiment, a first acoustic wave is generated. At least a first portion of which travels along a wall of a wellbore that traverses a formation, wherein the first portion of the first acoustic wave interacts with a feature on the wall of the wellbore, thereby generating a second acoustic wave (702). The second acoustic wave is detected to obtain acoustic data (704). A chevron pattern within the acoustic data is identified (706) using the acoustic data. A location for the feature is determined using the identified chevron pattern (708).

In further illustrative embodiments, an ultrasonic measurement system having some standoff distance from the wellbore wall and associated processing techniques may use reflected waves to produce a simple and robust measurement of a surface. The combination of two types of reflected pulses in such a measurement geometry can be used to identify and locate features within the wellbore wall (e.g., fractures or inclusions). One of the pulse types is the specular reflection from the surface of the formation (e.g., the wellbore wall), which provides a reference location for the surface and the stand-off distance of the sensor from the wellbore wall (given a known or derived mud acoustic compressional wave speed). The other pulse type is a mode-converted Scholte wave, emanating from a fracture or inclusion and traveling in the direction opposite to the compressional headwave that produces the Scholte wave. From those two pulses, a complete image of surface anomalies can be constructed (e.g., a black-field image), along with determining surface velocities at each anomaly location.

Figure 8A:
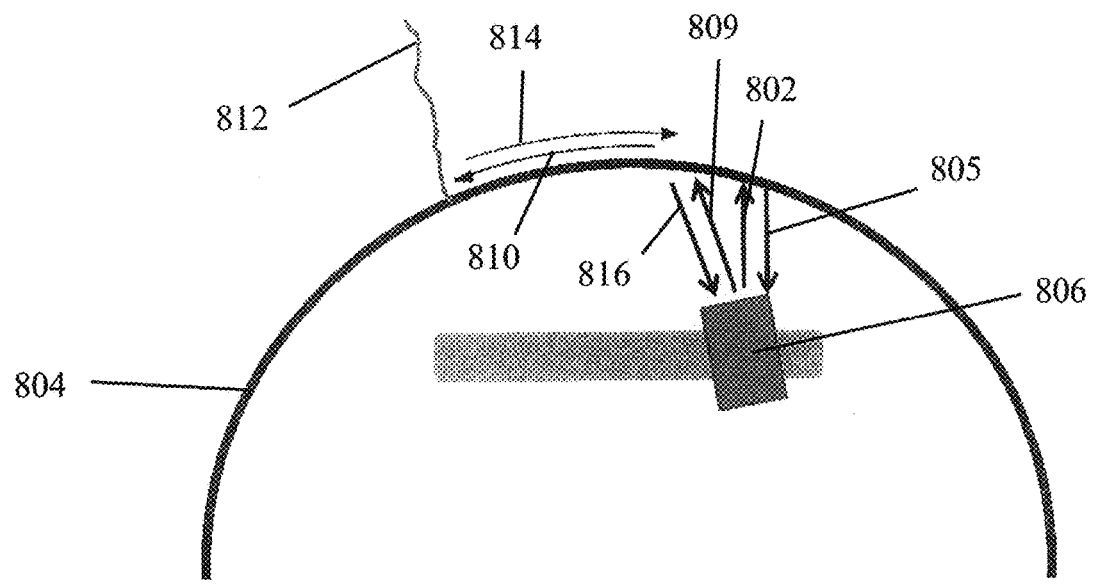
FIG. 8A shows a schematic drawing of an acoustic tool having a transducer disposed in a wellbore in accordance with various embodiments of the present disclosure.

Ultrasonic transducers transmit and receive energy at a multitude of angles relative to their active faces. The angular width of those angles is known as the angular spectrum of the transducer. The angular spectrum varies in predictable fashion, based on the transducers width, or diameter, and the frequency of operation. FIG. 8A schematically shows a transducer 806, in a wellbore 804, which has a broad angular spectrum. The transducer 806 can transmit and receive a compressional wave into the wellbore fluid that has components of energy at a variety of angles. A portion of the compressional wave 802 from the transducer 806 propagates at an angle such that the wave strikes the wellbore surface 804 normal to its local tangent. This results in a specular reflection of the compressional wave 805 that returns to, and is detected by, the transducer 806. The specular reflection signal can be used, for example, for wellbore surface imaging and for spatial position reference of the tool (transducer) relative to the wellbore surface. FIG. 8A also shows another portion of the compressional wave 809 that propagates at an angle through the wellbore fluid. The wave 809 strikes the wellbore wall 804 and produces a compressional headwave 810 that travels along the wellbore wall and fluid interface. The compressional headwave 810 travels long the interface and impinges on a feature 812 with an acoustic impedance contrast (such a fracture). The compressional headwave 810 gives rise to a reflected Scholte wave 814 upon interaction with the feature that, in turn, produces a returning compressional wave 816 in the wellbore fluid. The compressional wave 816 is detected as a signal at transducer 806 due to its broad angular spectrum.

Figure 9:
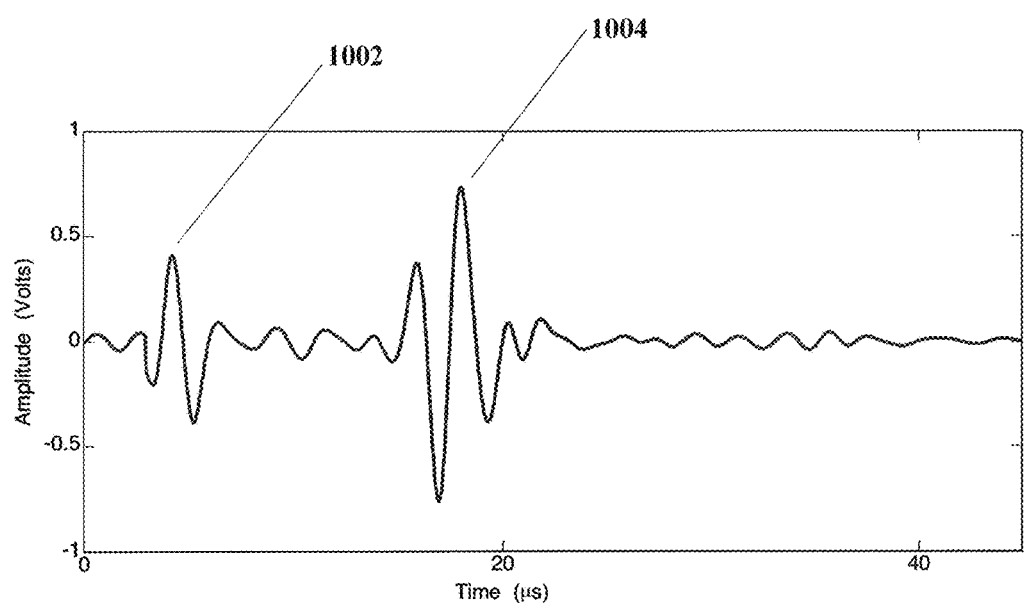
FIG. 9 is a plot of a single waveform showing surface specular reflection and headwave reflection from an acoustic impedance contrast in accordance with various embodiments of the present disclosure.

As mentioned above, a (compressional) headwave travelling along the sample/fluid interface gives rise to a mode-converted Scholte wave when it encounters a feature with an acoustic impedance contrast (such as a fracture or lamination boundary). While Scholte waves emanate from the fracture in both directions away from the fracture along the interface, the Scholte wave that travels in the direction opposite to the direction of the "source" compressional headwave is referred to herein as a "reflected" Scholte wave. FIG. 9 is a plot of a single waveform in which the first arrival (in the neighborhood of five μs) is the specular reflection 1002 from the wall of the wellbore and the second arrival (in the neighborhood of eighteen μs) is the reflected Scholte wave 1004.

Figure 10:
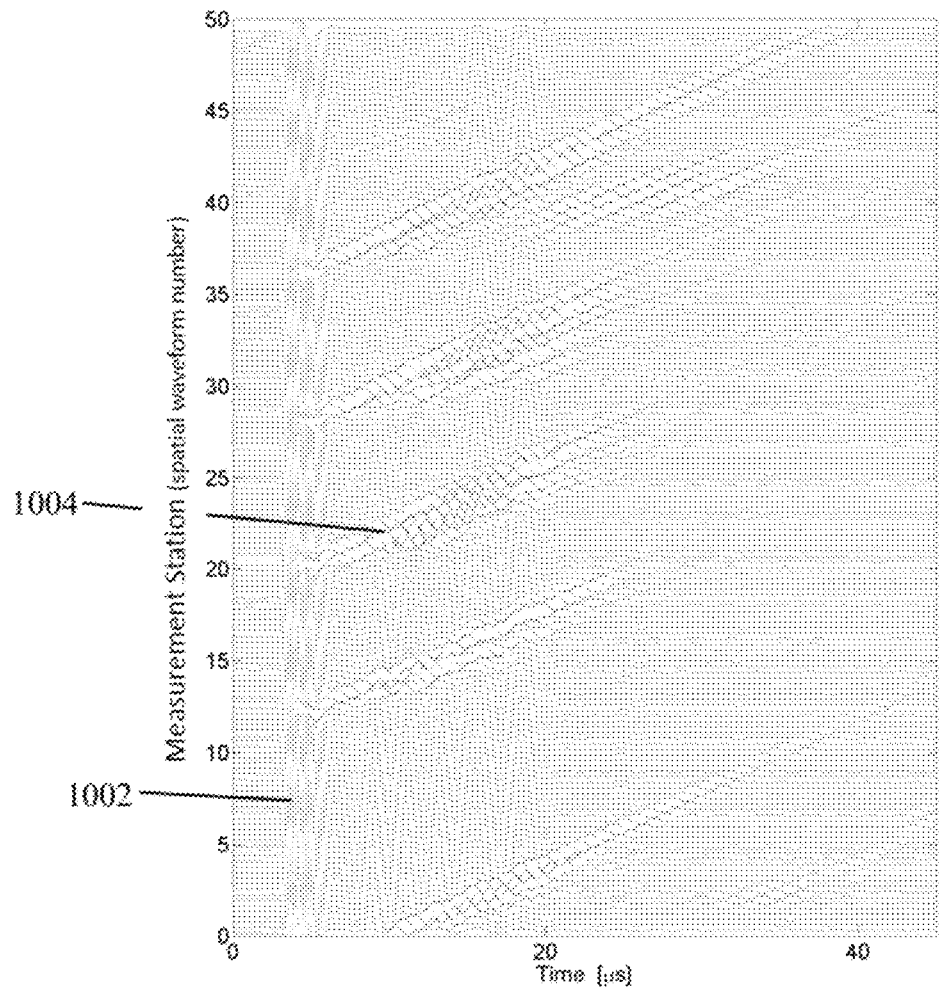
FIG. 10 is a selection of recorded waveforms along a vertical line on a sample at 1 mm steps in accordance with various embodiments of the present disclosure.

The reflected Scholte waves appear as chevron patterns in a record containing several waveforms recorded at various measurement stations. FIG. 10 is a selection of recorded waveforms displayed as a waterfall plot, at 1 mm steps, along an axial line on a sample having fractures. The specular reflection 1002 from the formation surface is visible around five μs. The specular reflection travel path is typically the fastest acoustic path to the wall of the wellbore and back to the transducer. The arrival times for the specular reflection and the reflected Scholte wave will depend on the stand-off distance. The sample used for the generation of the signals in FIG. 10 was flat and the scan axis was parallel to the surface, such that no significant time variations existed because the stand-off distance was constant. In cases where the stand-off distance will vary as acoustic data is recorded (e.g., in the case of a wellbore), the arrival time for the specular reflection can be used to normalize arrival time for the reflected Scholte wave. The normalization is performed by applying a time shift to waveforms to account for deviations in the standoff distance. The time shift corresponds to the arrival time for the specular reflection. Each waveform is normalized to generate normalized acoustic data. Once such normalizations are made so the effective standoff distance is the same for some or all the recorded waveforms, the reflected Scholte wave will appear as a chevron (a linear move-out) pattern 1004 as seen in FIG. 10. The use of the specular reflection to normalize the measurement stations to a single reference in time allows for a straight forward analysis of the fracture-induced chevron. Now the onset location and the slope of the chevron pattern are more easily determined.

As can be seen by following the chevron patterns towards earlier times, the chevron patterns have their time onsets at the specular reflection. A particular chevron and specular reflection intersection correlates to a particular measurement station. For example, the chevron pattern 1004 in FIG. 10 that runs approximately from (24, 26) to (5, 20) correlates to a fracture (i.e., mode-conversion inducing boundary) located in the wellbore at measurement station 20. Because the location of each measurement station is known in depth and azimuth (or in time for an LWD tool), once a particular measurement station is identified, one knows the location of the fracture on the wellbore surface. While this example is for an axial survey, the technique is similarly applicable to an azimuthal survey. In that case the wellbore depth, where the measurements are made is known and the survey allows one to identify the azimuthal location(s) of the fracture(s) in the wellbore.

Figure 11:
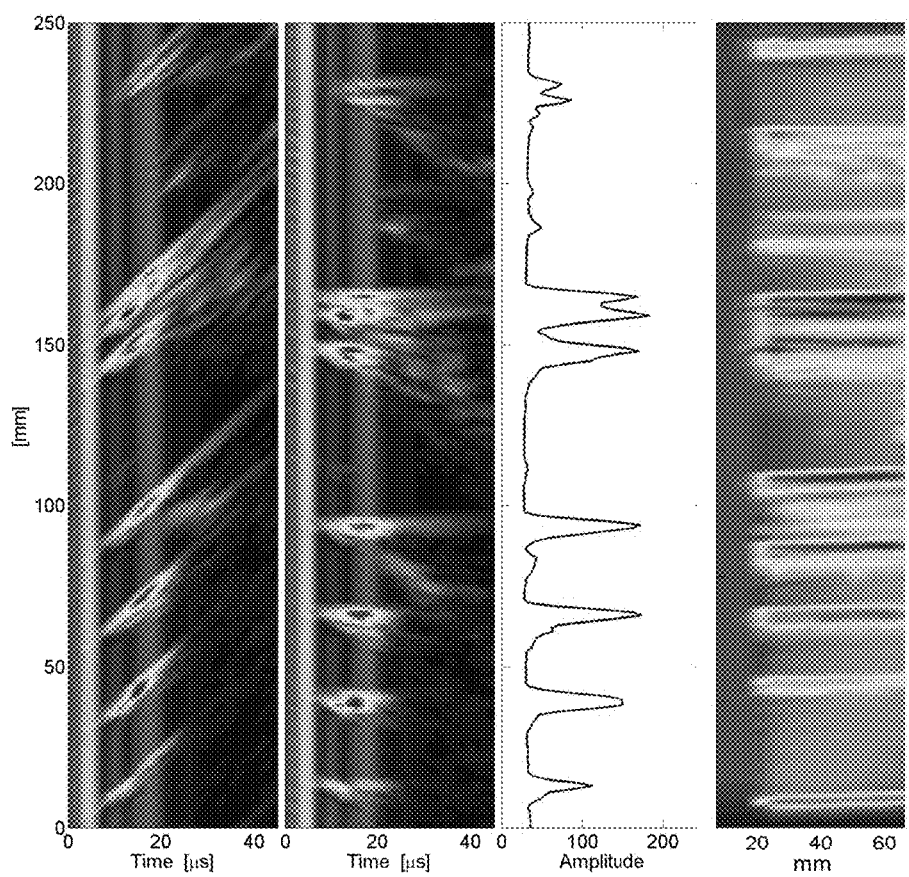
FIG. 11 is a set of four plots showing, from left to right, the recorded VDL, the recorded VDL for which move-out has been compensated, a graph of the integrated amplitudes, and a pulse-echo amplitude map in accordance with various embodiments of the present disclosure.

FIG. 11 is a set of four plots showing the recorded VDL, the recorded VDL for which acoustic data has been normalized, a graph of the integrated amplitudes, and a pulse-echo image. The leftmost plot shows the raw VDL as recorded. The plot that is second from the left has a "circular" shift applied to the raw waveform envelope VDL data matrix (with zero-padding to avoid the folding back of signals from one side of the scan to the other) where the pivot point is the specular reflected Scholte wave intersection point. The third plot from the left shows the integration of each envelop intensity after the dynamic circular shift (increasing with increasing time) has been applied. The various fractures in the sample are clearly visible as strong reflection peaks. Accordingly, FIG. 11 shows that the method described herein can be used to locate fractures using chevron patterns. Specifically, a stacking approach is applied to the Hilbert envelope VDL which aligns the chevrons horizontally in the VDL. An integration of the waveform envelope amplitude may be used to characterize the strength of the reflection. The integrated amplitude for each reflector is proportional to the reflection coefficient of the feature inside the sample. The resulting fracture image is shown in the VDL plot on the far right.

The formation velocity associated with each chevron feature is determined by local formation parameters (e.g., velocities, acoustic moduli) at the point of origin of the feature. By varying the transducer angle, the relative intensities of specular reflections and reflected Scholte waves can be adjusted. At small angles that are nearly normal to the wellbore surface, the specular reflection signal is dominant, while at large angles away from normal, the reflected Scholte wave features become dominant. These variations in transducer angles will cause variations in the amplitudes of these signals, but it will not change their arrival times for any measurement station. Thus, for the case of the fracture chevron, its slope will be related to the formation velocity at the point of origin on the wellbore.

It is possible to directly obtain the local speed of sound in a sample material (e.g., the subsurface formation) from the slope of the chevron pattern. Using normalized acoustic data, the slope of each fracture chevron (e.g. in the far-right plot of FIG. 11) can be analyzed directly to provide a velocity. For a LUCITE™ sample, a velocity of about 2700 m/s was obtained, which agrees well with the published value of 2.69 mm/μs for compressional acoustic velocity of waves having frequencies below 1 MHz.

Reflected Scholte wave fracture imaging and velocity mapping can be implemented using a pad device (e.g., transmitters and/or receivers are placed on a pad that is placed in contact with the wellbore wall). Wellbore fluids are often very attenuative to ultrasound waves. The greatly reduced standoff would make measurements less sensitive to wellbore fluid properties. This would allow the use of higher frequencies (e.g., 500 kHz to 2 MHz), offering high resolution. Standard implementations using more significant standoff, as shown in FIG. 8A, may be limited to lower frequencies, due to the additional attenuation from the wellbore fluid.

Figure 8B:
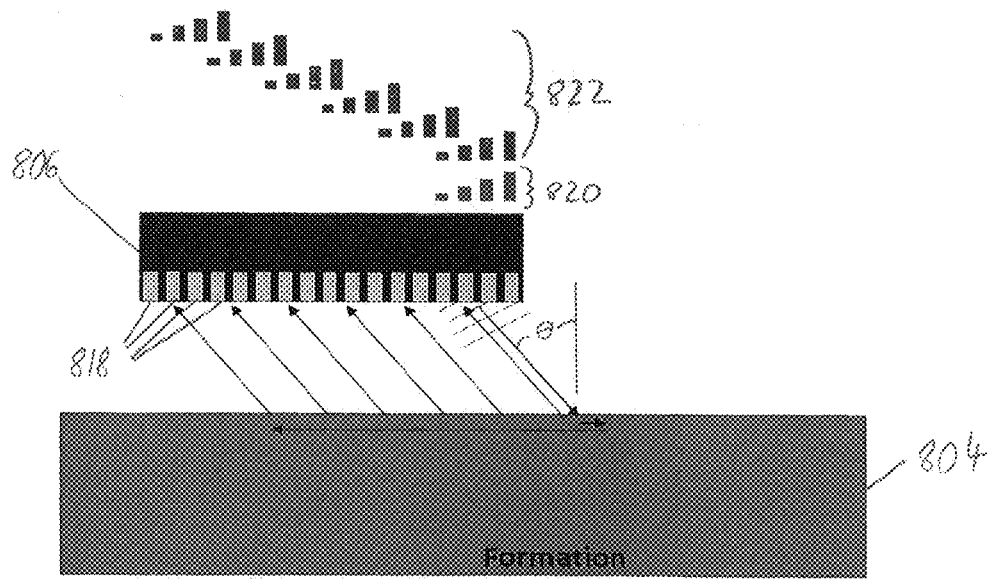
FIG. 8B shows a phased array transducer in accordance with various embodiments of the present disclosure.

In various embodiments, the transceiver 806 can be a phased array transducer. A phased array transducer offers more flexibility in variations of the angular coverage. A phased array transducer allows a beam to be electronically steered to a certain angle. This beam steering can be used to either optimize surface imaging capabilities by emphasizing the specular reflection, or to optimize the phase-matching condition (governed by the wellbore fluid and formation acoustic properties) to most efficiently excite the compressional headwave in the formation. The phased array transducer can be configured to emulate a single transducer that can vary its angular coverage, or configured to emulate several individual transducers, each providing independent measurement locations and coverage angles. For example, a phased array transducer may include segments that operate as transmitters and other segments that operate as receivers. Implementation of the dual "reflection" measurement with a phased array transducer allows for beam steering and, therefore, on-the-fly adjustment of the relative intensities of the different pulses in the measurement system. By changing the beam angle from one relative angular position to another, either the specular reflection or the "reflected" Scholte wave can be emphasized, or an intermediate beam angle can be chosen to have both pulses available in a single waveform. FIG. 8B shows a phased array transducer 806 that includes a plurality of segments 818. In this case, four segments 818 (on the right portion) of the phased array 806 are used to transmit waves to the formation 804 and each of the segments is used to receive the returning waves. FIG. 8B also shows the time delay 820, in time graph form, used in emission for each segment to produce waves that travels at an angle (θ) to the formation 804. In some embodiments, the time delays may be chosen such that the emitted waves travel in a direction normal to the formation 804. The segments 818 of the phased array 806 can also be tuned to receive waves travelling at particular angles. FIG. 8B shows the time delay 822 in reception for each segment to receive waves that travels at an angle (θ) to the formation 804.

Figure 12:
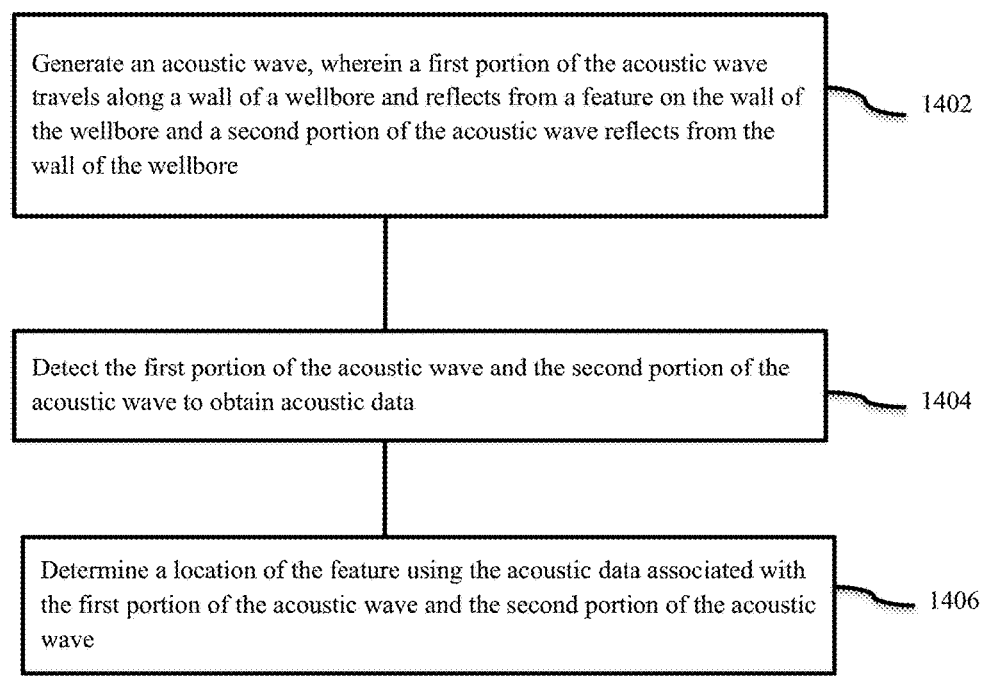
FIG. 12 is a flowchart for using an acoustic array to infer one or more characteristics of a subsurface formation in accordance with various embodiments of the present disclosure.

FIG. 12 is a flowchart showing one possible embodiment. In this embodiment, an acoustic wave is generated, wherein a first portion of the acoustic wave travels along a wall of a wellbore and reflects from a feature on the wall of the wellbore and a second portion of the acoustic wave reflects from the wall of the wellbore (1402). The first portion of the acoustic wave and the second portion of the acoustic wave are detected to obtain acoustic data (1404). A location of the feature is determined using the acoustic data associated with the first portion of the acoustic wave and the second portion of the acoustic wave (1406).

While embodiments described herein have focused on applications in the oilfield service industry, other applications are possible and contemplated. For example, the techniques described herein may be used for non-destructive testing. For example, the techniques may be used for fracture or crack detection in pipes, storage tanks, or pressure vessels.

Figure 13:
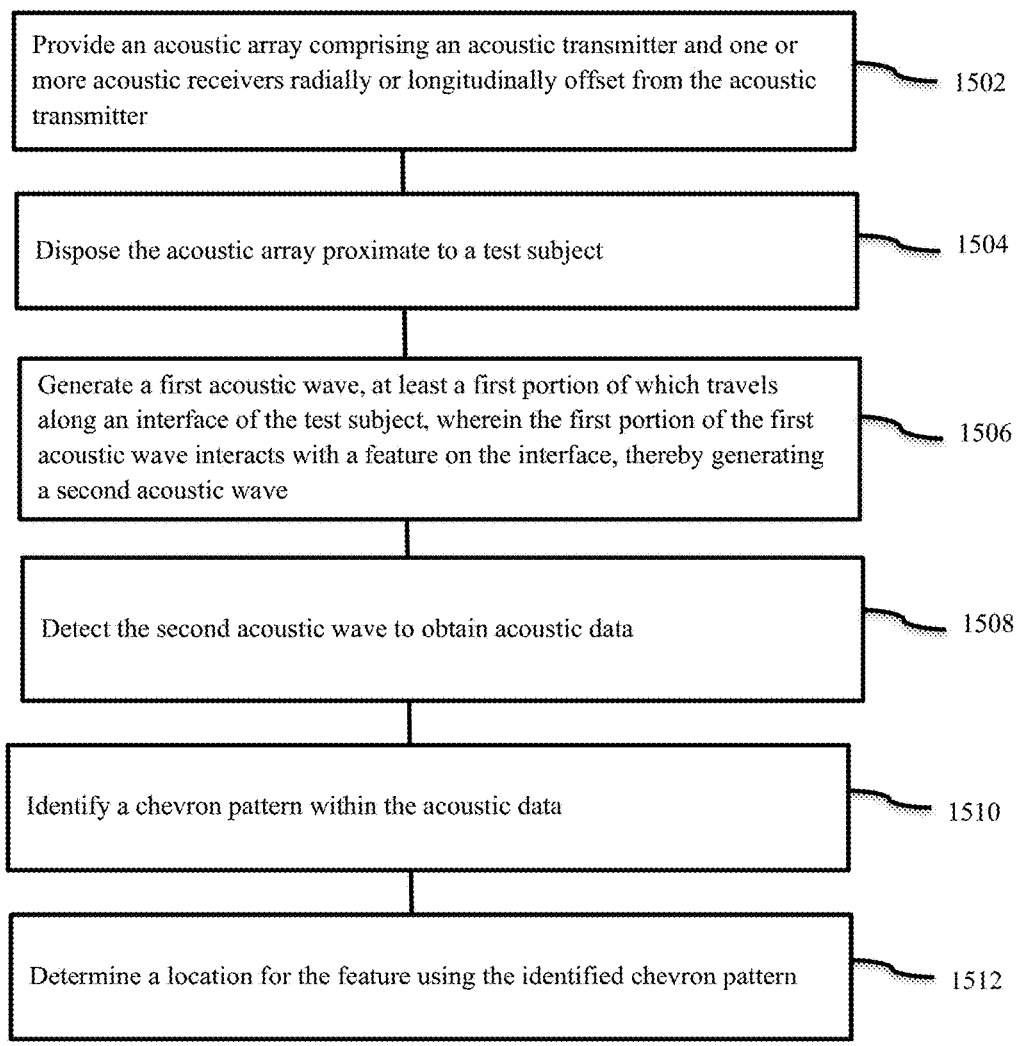
FIG. 13 is a flowchart for using an acoustic array to infer one or more characteristics of a test subject in accordance with various embodiments of the present disclosure.

FIG. 13 is a flowchart showing one possible embodiment. In this embodiment, an acoustic array comprising an acoustic transmitter and one or more acoustic receivers radially or longitudinally offset from the acoustic transmitter is provided (1502). The acoustic array is disposed proximate to a test subject (1504). A first acoustic wave is generated, at least a first portion of which travels along an interface of the test subject, wherein the first portion of the first acoustic wave interacts with a feature on the interface, thereby generating a second acoustic wave (1506). The second acoustic wave is detected to obtain acoustic data (1508), and a chevron pattern is identified within the acoustic data (1510). A location for the feature is determined using the identified chevron pattern (1512).

Some of the methods and processes described above, such as normalizing acoustic data, identifying chevron patterns in acoustic data, and locating fractures using the chevron patterns, can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general purpose computer) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device for storing acoustic data.

Some of the methods and processes described above, as listed above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Some of the methods and processes described above can be implemented using such logic devices.

Although several example embodiments have been described in detail above, those skilled in the art will readily appreciate that many modifications are possible in the example embodiments without materially departing from the scope of this disclosure. Accordingly, all such modifications are intended to be included within the scope of this disclosure.

What is claimed is:

1. A method comprising:
   generating a first acoustic wave, at least a first portion of which travels circumferentially along a wall of a well bore that traverses a formation, wherein the first portion of the first acoustic wave interacts with a feature on the wall of the well bore, thereby generating at least a Scholte wave and a compressional headwave;
   detecting the compressional headwave and the Scholte wave to obtain acoustic data;
   generating a spatial image of the acoustic data in time or depth versus azimuth, wherein the spatial image indicates an arrival of the Scholte wave and an arrival of the compressional headwave;
   identifying a chevron pattern in the spatial image; and
   determining a location for the feature using the identified chevron pattern.

2. The method of claim 1, wherein at least a portion of the Scholte wave propagates at least partially in a circumferential direction along an interface between a well bore fluid and the wall of the well bore in a direction opposite to the first portion of the first acoustic wave.

3. The method of claim 2, wherein the first portion of the first acoustic wave is a compressional headwave.

4. The method of claim 1, wherein the Scholte wave is a first Scholte wave that propagates along an interface between the well bore fluid and the wall of the well bore in an opposite circumferential direction to the first portion of the first acoustic wave, wherein a second Scholte wave propagates circumferentially along an interface between the well bore fluid and the wall of the well bore in a same direction as the first portion of the first acoustic wave, and wherein detecting the Scholte wave comprises detecting the first and second Scholte waves.

5. The method of claim 4, wherein the first portion of the first acoustic wave is a compressional headwave.

6. The method of claim 1, wherein the Scholte wave and the compressional headwave is detected using a plurality of receivers separated apart in a common axial plane.

7. The method of claim 1, wherein the first acoustic wave is generated and the Scholte wave and the compressional headwave is detected using a single transducer.

8. The method of claim 1, wherein the spatial image comprises at least one of a variable density log image and a waveform waterfall image.

9. The method of claim 1, wherein determining the location of the feature using the chevron pattern comprises:
   determining a slope of the chevron pattern within the spatial image; and
   determining a velocity of the formation or a slowness of the formation using the determined slope.

10. The method of claim 1, wherein determining the location of the feature using the chevron pattern comprises:
    determining an intersection point of the chevron pattern with a first arrival corresponding to the detected compressional headwave; and
    determining the location of the feature using the intersection point.

11. The method of claim 1, wherein the feature comprises a fracture on the wall of the well bore.

12. The method of claim 1, wherein the acoustic data comprises a waveform data set, and determining a location for the feature comprises producing a wellbore fracture map using the waveform data set.

13. The method of claim 1, further comprising determining a characteristic of the formation using the acoustic data, wherein the characteristic of the formation is selected from the group consisting of: a fracture, a fracture count, an inclusion, a wellbore surface profile, a formation acoustic wave speed, Young's modulus for the formation, Poisson's ratio for the formation, and a bulk modulus for the formation.

14. The method of claim 1, wherein the feature comprises a fracture on the wall of the well bore and the method further comprises determining whether the fracture is open or closed.

15. The method of claim 1, wherein the first acoustic wave has a frequency in the range of 50 kilohertz to 2 megahertz.

16. A method comprising:
    generating an acoustic wave, wherein a first portion of the acoustic wave travels circumferentially along a wall of a well bore and reflects from a feature on the wall of the well bore and a second portion of the acoustic wave reflects from the wall of the well bore, such that at least a Scholte wave and a compressional headwave are generated;
    detecting the Scholte wave and the compressional headwave to obtain acoustic data;
    generating a spatial image of the acoustic data in time or depth versus azimuth, wherein the spatial image indicates an arrival of the Scholte wave and an arrival of the compressional headwave;
    identifying a chevron pattern in the spatial image; and
    determining a location of the feature using the identified chevron pattern.

17. The method of claim 16, wherein determining a location of the feature comprises using an arrival time for the compressional headwave to normalize an arrival time for the Scholte wave.

18. The method of claim 17, wherein determining a location of the feature further comprises:
    generating normalized acoustic data from the normalized arrival time for the Scholte wave; and
    identifying the chevron pattern within the normalized acoustic data.

19. The method of claim 16, wherein the acoustic wave is generated using a phased array transducer.

20. The method of claim 16, wherein acoustic waves are generated and detected using a single transducer.

21. A system for locating features in a wellbore, the system comprising:

a wellbore tool configured to transmit acoustic waves and detect acoustic waves to obtain acoustic data; and a processor configured to cause the system to perform operations, the operations comprising:

generating a first acoustic wave, at least a first portion of which travels circumferentially along a wall of a well bore that traverses a formation, wherein the first portion of the first acoustic wave interacts with a feature on the wall of the well bore, thereby generating at least a Scholte wave and a compressional headwave;

detecting the compressional headwave and the Scholte wave to obtain acoustic data;

generating a spatial image of the acoustic data in time or depth versus azimuth, wherein the spatial image indicates an arrival of the Scholte wave and an arrival of the compressional headwave;

identifying a chevron pattern in the spatial image; and determining a location for a feature within the wellbore using the identified chevron pattern.

22. The system of claim 21, wherein the feature comprises a fracture on a wall of the wellbore.

23. The system of claim 21, wherein the wellbore tool comprises at least one transmitter configured to transmit acoustic waves and a plurality of receivers configured to receive acoustic waves.

24. The system of claim 23, wherein the plurality of receivers are spaced radially along the wellbore tool.

25. The system of claim 21, wherein the wellbore tool comprises a transducer configured to transmit acoustic waves and receive acoustic waves, and wherein the transducer is a phased array transducer.

26. The system of claim 21, wherein the wellbore tool comprises:

at least one transmitter configured to transmit acoustic waves;

at least one receiver configured to receive acoustic waves; and a pad configured to contact a wall of the wellbore, wherein at least one of the transmitter and the receiver are disposed on the pad.

* * * * *